United States Patent [19]

Peterson

[11] 4,137,853
[45] Feb. 6, 1979

[54] FOLDING GRAIN DRILL DRIVE INCLUDING SEED DISPENSING CLUTCH ACTUATED BY TENSIONING PULLY ON GROUND DRIVE

[76] Inventor: Harley G. Peterson, Rte. 1, Salina, Kans. 67401

[21] Appl. No.: 826,960

[22] Filed: Aug. 22, 1977

[51] Int. Cl.² ............................ A01C 7/00; A01B 33/08
[52] U.S. Cl. ........................................ 111/67; 111/34; 111/57; 172/75; 172/106; 172/311; 192/23; 192/70.22; 222/616
[58] Field of Search ................ 111/14, 18, 20, 21, 111/34, 36, 37, 78, 52–58, 67, 68, 59, 60, 83; 172/75, 104, 399, 402, 403, 404, 106, 311; 192/67 R, 23, 70.22, 70.29; 222/615, 616

[56] References Cited

U.S. PATENT DOCUMENTS

| 473,413 | 4/1892 | Bering | 111/21 |
| 938,492 | 11/1909 | Knoblock | 111/56 |
| 1,259,511 | 3/1918 | Graham | 172/402 |
| 1,641,706 | 9/1927 | Strandlund | 111/68 UX |
| 2,031,650 | 2/1936 | Hendricks et al. | 111/68 |
| 2,210,994 | 8/1940 | White | 111/67 |
| 2,713,836 | 7/1955 | Ajero | 111/67 X |
| 3,291,222 | 12/1966 | Ralston | 111/67 X |
| 3,411,467 | 11/1968 | Van der Lelx et al. | 111/36 X |

FOREIGN PATENT DOCUMENTS

| 240067 | 8/1962 | Australia | 111/70 |
| 1178262 | 9/1964 | Fed. Rep. of Germany | 192/67 R |
| 561625 | 4/1957 | Italy | 192/67 R |

Primary Examiner—Edgar S. Burr
Assistant Examiner—Steven A. Bratlie
Attorney, Agent, or Firm—Edward L. Brown, Jr.

[57] ABSTRACT

A pull type folding grain drill driven by the gauge wheels including pivoting legs carrying the gauge wheels which drive a clutch shaft through a first chain and sprocket drive, the clutch shaft axis being offset from the pivoting leg axis. A second chain and sprocket drive between the dispensing seed shaft and the clutch shaft including an idler pulley having cam means on the end thereof for disengaging a clutch on the clutch shaft when the pivoting legs are rotated to lift the planter out of the ground in the transport position.

8 Claims, 7 Drawing Figures

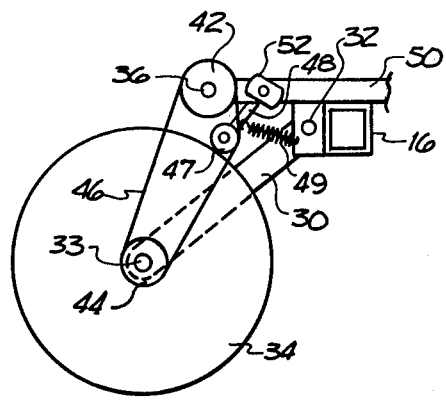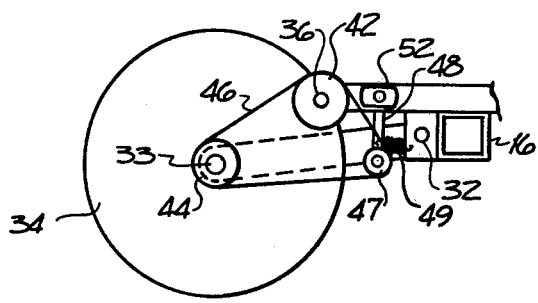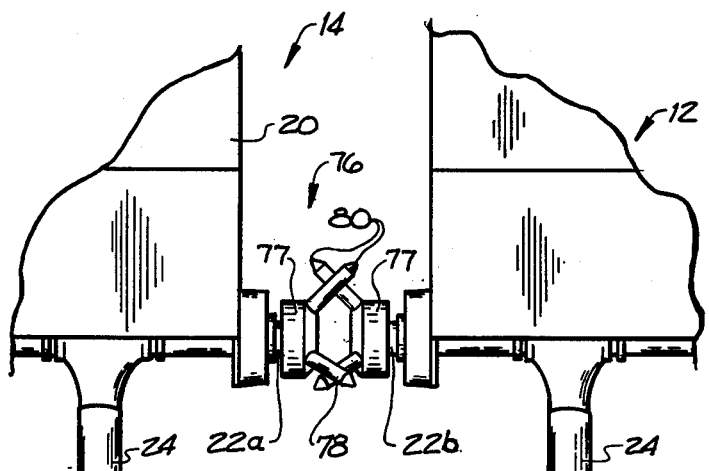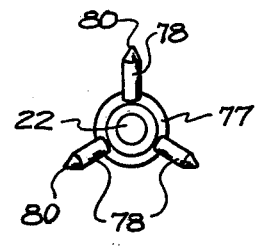

FOLDING GRAIN DRILL DRIVE INCLUDING SEED DISPENSING CLUTCH ACTUATED BY TENSIONING PULLY ON GROUND DRIVE

BACKGROUND OF THE INVENTION

While the general concept of driving a grain drill off the ground support gauge wheels has been done before, it has never been utilized on folding grain drills. Folding drills in the prior art, as well as many non-folding drills, are driven off the press wheels of the drill which function to lightly close the furrow after the seed has been deposited. While there are many types of press wheels, the most common are constructed as a pair of facing metal discs with very little traction with the contacting earth depending upon the soil type and condition. Any slippage of these press wheels varies the spacing of the seed being discharged, lending to an inaccurate system. If the soil conditions are wet, with certain soils, there is varying amounts of slippage which the farmer cannot control. Press-wheel driven drills are also unreliable in that gangs of press wheels in certain fields pick up trash and cake with mud causing the press wheels not to turn. Quite often this will happen with the farmer not even being aware that a portion of his drill is not functioning, thereby wasting portions of his field which cannot be replanted that year. To alleviate this problem, press-wheel drive drills have gone to expensive and complex electronic monitoring systems which must constantly monitor the various gangs of press wheels at all times to make sure they are all turning.

DESCRIPTION OF THE INVENTION

The present invention has done away with any need for this expensive electronic monitoring with a reliable drive system which does not bind up with trash and mud nor slip under varying soil conditions. The present invention drives the wing sections of the drill directly off the large rubber-tired gauge wheels which carry the weight of the drill. With a three-section drill there are two gauge wheels on the center section and one individual gauge wheel on each wing section. Some of the larger drills approach 59 feet in width and exceed three tons in weight. A chain and sprocket drive on each wing gauge wheel drives an individual clutch shaft journaled to the frame. The opposite end of the clutch shaft in turn drives the seed shaft through a sprocket and chain drive which dispenses the seed. Located on the clutch shaft is a mechanical ball type clutch which is normally engaged when the drill is in its planting position. When the gauge wheels are lowered by the lifting cylinders so that the drill is lifted out of the ground to its transport position, a cam means automatically disengages the clutch so that the seed shaft no longer rotates and dispenses seed. This cam actuation is caused by the geometry of locating the clutch shaft at a position offset from the axis of the pivoting legs so that when the pivoting legs or gauge wheels are pivoted on the drill frame, the distance between the clutch axis and gauge wheel axis increases thereby causing an idler pulley to rotate, causing the cam means to disengage the clutch.

Due to the substantially greater traction of the gauge wheels over the press wheels, the reliability factor and accuracy over press wheel drives is much improved.

Therefore it is the principal object of the present invention to provide a folding drill driven from the gauge wheels with much improved reliability and accuracy.

Another object of the present invention is to provide a simplified and economical folding drill drive means having automatically aligning couplings between the center section and one wing.

A further object of the present invention is to provide a gauge wheel type drive on a folding drill with a very simplified and maintenance free mechanical clutch for disengaging the drive in its transport position.

Another object of the present invention is to provide a folding drill drive with a reduction in the numbers of drive chains and accompanying sprockets.

Further objects and advantages of the present invention will be apparent from the following detailed description of certain presently preferred embodiments thereof, which are illustrated in the accompanying drawings:

FIG. 4 is a partially schematic view of the gauge wheel and drive mechanism in the transport position;

FIG. 5 is a partially schematic view of the gauge wheel and drive mechanism in the planting position;

FIG. 6 is a partial elevational view between two sections of the drill; and

FIG. 7 is an end view of the coupling shown in FIG. 6.

Figure 1:
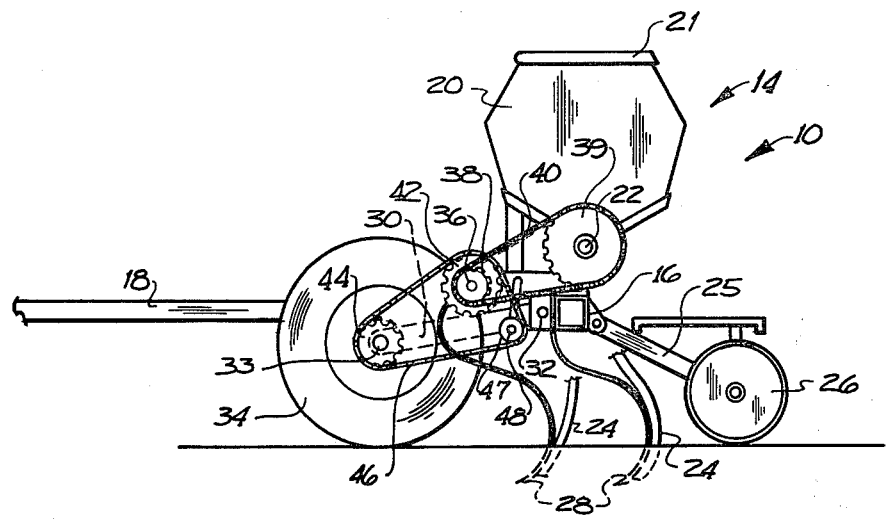
FIG. 1 is a side elevational view of a folding drill in the planting position with portions of the drill removed to better illustrate the geometry of the drive means.

Referring now to FIG. 1 of the drawing, the drill is generally described by reference numeral 10. Drill 10 is a pull type folding drill, with a center section and two wing sections, the center section 12 and wing section 14 are partially shown in FIG. 6, while the remaining wing section is identical. The drill 10 is made up of a tubular frame 16 which includes a forwardly extending hitch 18, the end of which is broken away to conserve space, the end portion of the hitch being a conventional tongue attachable to the rear of any tractor. Tubular frame 16, while not shown in the drawing, is hinged about a vertical axis between each of the sections 12 and 14 so that the drill can be folded 90° for road transport. Each section of the drill includes a single drill box 20 with a removable top 21 for receipt of the seed grain. Running longitudinally along the length of box 20, along its bottom edge, is a seed shaft 22 which dispenses the seed into a plurality of seed tubes 24. The lower ends of tubes 24 are attached to the spring tooth openers 28. Pivotally attached to the drill frame 16, though links 25, are gangs of press wheels 26 which function to close the seed furrow dug by openers 28. There are various other types of openers besides the hoe-type ones shown in the drawing, as well as different types of press wheels 26.

Pivotally attached to drill frame 16 is a pivoted leg 30 swinging about a horizontal axis 32. Attached to the outer end of leg 30 is axle 33 supporting pneumatic gauge wheel 34. Pivoting leg 30 is positioned by a conventional double acting hydraulic cylinder, not shown in the drawing, which positions the drill depth or raises the drill completely out of the ground in the transport position, as illustrated in FIG. 4. Pivoting arm gauge wheels are very common in all types of drills and tillage implements used in the farming industry.

Rotatably journaled to the drill frame 16 is a clutch shaft 36. Positioned on one end of shaft 36 is a sprocket 38. Sprocket 38 drives sprocket 39 positioned on the end of seed shaft 22 through chain 40. On the opposite end of clutch shaft 36 is sprocket 42 which is driven by gauge wheel sprocket 44 through chain 46. Also engaging chain 46, and maintaining tension thereon, is idler pulley 47 rotatably mounted on idler arm 48 which is spring-biased in a counterclockwise direction as viewed from FIG. 1 by spring 49, seen in FIGS. 2, 4 and 5.

Figure 2:
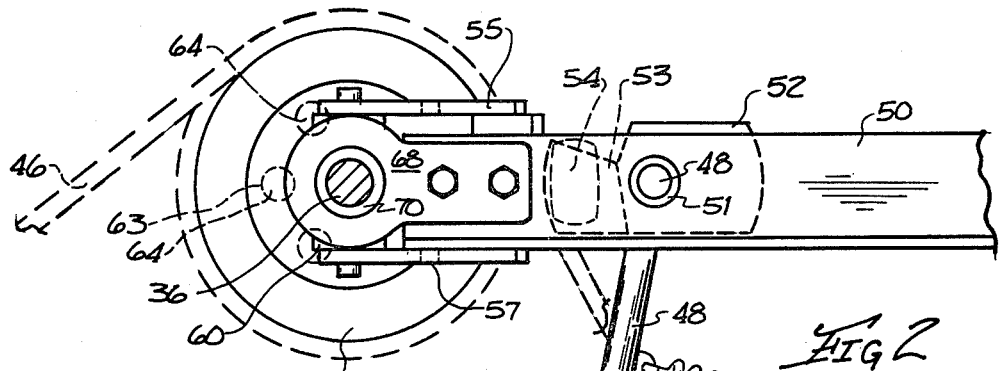
FIG. 2 is an enlarged fragmentary side elevation of the cam means and clutch mechanism.
Figure 3:
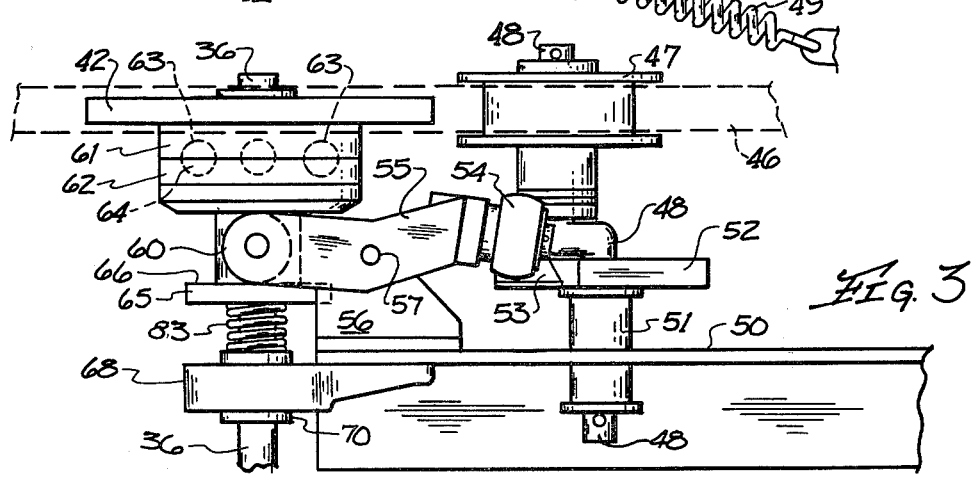
FIG. 3 is an enlarged fragmentary top view of the cam and clutch mechanism.

Idler arm 48 is rotatably journaled at its opposite end to frame member 50 by journal 51, as seen in FIGS. 2 and 3. Also, rigidly connected to idler arm 48 is a rotary cam member 52 having a cam surface 53 thereon engaged by cam follower 54. Cam follower 54 is rotatably attached to the end of rocker arm 55 which in turn is pivotally mounted on a stationary bracket 56 by a pin 57. The opposite end of rocker arm 55 contains a pair of clutch-engaging rollers 60. Positioned on clutch shaft 36, as seen in FIG. 3, is a clutching mechanism including a pair of opposing clutch plates 61 and 62 biased together by compression spring 83. The facing surfaces of plates 61 and 62 have a plurality of semi-spherical cavities 63 concentrically spaced around shaft 36 for receipt of a plurality of balls 64. Positioned on the other side of clutch plate 62 is a spool-shaped member 65 having a radial groove 66 sized to receive roller 60. Clutch plate 61 is rigidly attached to sprocket 42 while clutch plate 62 and spool 65 are splined to shaft 36. When rocker arm 55 is tilted counterclockwise from the FIG. 3 position, a distance half the diameter of balls 64, the clutch mechanism will disengage allowing plate 61 to rotate relative to plate 62. Clutch shaft 36 is journaled to the frame 50 through bracket 68 and thrust bearing 70.

FIG. 6 illustrates a carry-over drive means between the wing section 14 and the center section 12 of the drill 10. The seed shaft 22A of wing section 14 is driven by gauge wheel 34 as described in FIG. 1. The seed shaft 22B in the center section 12 of the drill is also driven by the same gauge wheel 34 through a self-aligning universal coupling 76. Coupling 76 comprises a similar pair of spiders 77 having three prongs 78 extending radially outward therefrom approximately 45° from the axis of seed shaft 22. The ends 80 of prongs 78 are pointed so that as the spiders 77 are brought together in engaging relationship, one will slide off the other by itself and pre-alignment is not necessary.

OPERATION

FIGS. 4 and 5 illustrate the relative position of the gauge wheel in the transport and planting positions, respectively. In the FIG. 5 planting position, pivoted leg 30 is relatively horizontal and the distance between the axis of clutch shaft 36 and gauge wheel axis 33 is relatively close. As leg 30 swings downward in a counterclockwise direction, this relative distance becomes greater due to the fact that the pivot point 32 of leg 30 is offset from the center of clutch shaft 36. To handle this increasing length between the two axes, idler arm 48 is pulled in a clockwise direction by chain 46 which encompasses clutch shaft sprocket 42, gauge wheel sprocket 44 and idler pulley 47. Idler pulley 47, in effect, functions as a chain tightener in the various positions of the gauge wheels.

In the drill position, as illustrated in FIGS. 5, 1, 2 and 3, the clutch is engaged and the seed shaft 22 is turning in relation to the rotation of gauge wheels 34 on the ground. In this position, idler arm 48 is substantially vertically positioned and cam surface 53 is in contact with cam follower 54. Various minor movements of gauge wheel leg 30 to adjust for varying planting depths will not cause clutch plates 61 and 62 to disengage. However, when gauging wheels 34 are rotated counterclockwise to the full down position, as illustrated in FIG. 4, the clutch plates will disengage. Idler arm 48 is caused to rotate approximately 40° in a clockwise direction, due to the increased distance between axis centers 33 and 36, thereby causing cam surface 53 to sufficiently move cam follower 54 so that the clutch plates 61 and 62 will be sufficiently spread to disconnect the seed shaft drive. The drill can now be moved in its transport position without dispensing seed.

Gauge wheel 34 on wing section 14 not only drives the seed shaft 22A, as seen in FIG. 6, but also drives the seed shaft 22B of the center section 12 while the opposing wing section has its own drive means identical to the other wing section 14. As the drill travels over uneven ground and wing section 14 falls out of axial alignment with center section 12, the universal joint 76 still maintains driving contact between the prongs 78 to drive the seed shaft of the center section 14. When wing section 14 is in its folded position, which is 90° from its aligned position of FIG. 6, the two spider elements 77 are moved apart and the coupling is disconnected. When the drill 10 is again ready for use and wing section 14 is swung into its aligned position, as seen in FIG. 6, and when the pointed prongs 80 come in contact with each other, they will slide to one side thereby providing a coupling without the necessity of hand alignment of the two relative spider units 77.

As stated previously, the drawings and description relate only to the preferred embodiments of the invention and since many changes can be made in the structure of these embodiments without departing from the inventive concept, the following claims should provide the sole measure of the scope of the invention.

What is claimed is:

1. A grain drill drive for use on a drill having the depth gauging wheels with drive sprockets thereon carried on pivoting legs attached to the frame and the grain box having a seed shaft for dispensing the seed, the drive comprising:

a clutch shaft rotatably journaled on the frame with its axis offset from the axis of the pivoting legs;

a first sprocket and chain means on the clutch shaft driving the seed shaft;

a second sprocket and chain means on the clutch shaft driven by the gauge wheel sprocket;

an idler arm which is pivotally mounted at one end on the frame, an idler pulley mounted on the opposite end of the arm, the pulley engaging the second chain means, biasing means urging the idler arm in a direction tensioning the second chain means;

rotating cam means attached to the pivoting end of the idler arm;

clutch means on the clutch shaft between the first and second sprocket and chain means including a rocker arm with a cam follower at one end engaging the cam means and a clutch disengaging means at the opposite end of the rocker arm; the axis of the clutch shaft being positioned on the frame relative to the gauge wheel axis and the pivoting leg axis so that rotation of the pivoting leg causes the distance between the gauge wheel axis and clutch shaft axis to increase and thereby cause the idler arm to rotate and disengage the clutch means so that the said seed shaft stops turning.

2. A grain drill drive as set forth in claim 1, wherein the clutch means includes a pair of clutch plates spring-biased together; formed in the contacting face of one plate is a plurality of semi-spherical cavities concentrically spaced around the axis of rotation of said plate, the opposing plate having a like set of cavities in adjacent juxtaposed relation and a plurality of balls positioned in said cavities to provide a driving connection when the pair of plates are together.

3. A grain drill drive as set forth in claim 1, wherein the clutch means includes a pair of clutch plates spring-biased together, one being fixed on the shaft; formed in the contacting face of one plate is a plurality of semi-spherical cavities concentrically spaced around the axis of rotation of said plate, the opposing plate having a like set of cavities in adjacent juxtaposed relation and a plurality of balls of substantially the same diameter as said cavities positioned in said cavities to provide a driving connection when the pair of plates are together.

4. A grain drill drive as set forth in claim 1, wherein the clutch means includes a pair of clutch plates spring-biased together, one being fixed on the shaft; formed in the contacting face of one plate is a plurality of semi-spherical cavities concentrically spaced around the axis of rotation of said plate, the opposing plate having a like set of cavities in adjacent juxtaposed relation and a plurality of balls of substantially the same diameter as said cavities positioned in said cavities to provide a driving connection when the pair of plates are together, and the clutch disengaging means including a laterally positioned roller carried on the opposite end of the rocker arm positioned in a radial groove in the opposing clutch plate.

5. A grain drill drive as set forth in claim 1, wherein the axis of the clutch shaft is positioned closer to the gauge wheel axis than the pivoting leg axis.

6. A grain drill drive as set forth in claim 1, wherein the axis of the clutch shaft is positioned closer to the gauge wheel axis than the pivoting leg axis and the idler pulley is positioned inside the second chain means.

7. A grain drill drive for use on folding drills having the depth gauging wheels with drive sprockets thereon carried on pivoting legs attached to the frame and at least two sections of the drill each having grain boxes with first and second seed shafts, the drive comprising:
a clutch shaft rotatably journaled on the frame with its axis offset from the axis of the pivoting legs;
a first sprocket and chain means on the clutch shaft driving the first seed shaft;
coupling means on the end of the first seed shaft and the second seed shaft which engages in a driving connection when a folding wing of the drill is pivoted into axial alignment with its adjacent drill section;
a second sprocket and chain means on the clutch shaft driven by the gauge wheel sprocket;
an idler arm which is pivotally mounted at one end on the frame, an idler pulley mounted on the opposite end of the arm, the pulley engaging the second chain means, biasing means urging the idler arm in a direction tensioning the second chain means;
rotating cam means attached to the pivoting end of the idler arm;
clutch means on the clutch shaft between the first and second sprocket and chain means including a rocker arm with a cam follower at one end engaging the cam means and a clutch disengaging means at the opposite end of the rocker arm; the axis of the clutch shaft being positioned on the frame relative to the gauge wheel axis and the pivoting leg axis so that rotation of the pivoting leg causes the distance between the gauge wheel axis and clutch shaft axis to increase and thereby cause the idler arm to rotate and disengage the clutch means so that the said seed shafts stop turning.

8. A grain drill drive as set forth in claim 7, wherein the coupling means is a pair of multiple prong spiders with the prongs positioned at approximately 45° to the seed shaft axis of rotation and having pointed ends for unassisted engagement.

* * * * *